3,594,354
METHOD OF INCREASING THE CURING RATE OF MONOEPOXIDE-CONTAINING COMPOSITIONS
Stanley M. Hazen, Cheswick, and William J. Heilman, Allison Park, Pa., assignors to Gulf Research & Development Company, Pittsburgh, Pa.
No Drawing. Filed Jan. 2, 1968, Ser. No. 694,842
Int. Cl. C08f 47/00
U.S. Cl. 260—78.5
11 Claims

ABSTRACT OF THE DISCLOSURE

A method is provided for increasing the rate of curing of a liquid coating and molding composition to form an infusible resinous article or coating. The composition comprises a solution of a polymerizable olefinically unsaturated monooxirane compound such as glycidyl methacrylate, a solid polyanhydride having at least three succinic anhydride groups (excluding aromatic anhydrides in which the alpha carbon atoms of the anhydride group are included in the aromatic ring), for example, the copolymer of a straight chain alpha-monoolefin and a maleic anhydride; and certain olefinically unsaturated monomers free of oxirane oxygen atoms, such as styrene or acrylonitrile. The rate of curing of this composition can be increased by adding to the above described composition a small amount of water on the order of 0.5 weight percent. The water is effective for increasing the rate of curing for the above composition whether the composition is cured thermally, with the use of a free radical catalyst such as an organic peroxide, for example benzoyl peroxide, with a soluble tertiary amine such as 3-picoline, or with a combination of heat, organic peroxides and tertiary amines.

---

This invention relates to a method of increasing the rate of curing of liquid compositions capable of being cured to solid infusible resins having excellent physical and chemical properties.

Resinous compositions of many types are known in the art. Of special interest are epoxy resin compositions prepared by crosslinking of polyepoxides with various crosslinking or hardening agents such as mono or dianhydrides. In many ultimate applications of resins such as laminating, adhering objects together, encapsulating and filament winding it is important that the materials cure quickly to prevent volatilization, shrinkage or weight loss so that the final products have the desired physical and chemical characteristics. Other important characteristics are flexural strength and toughness, such as impact resistance or hardness and rigidity, where these are required, good heat distortion temperature properties, smoothness and clarity of films, dimensional uniformity of the end cured product and good adhesion, for these properties are often required. The reaction of solutions of a liquid olefinically polymerizable unsaturated monooxirane compound with a solid polyanhydride (where the anhydride groups are not directly attached to and form part of an aromatic ring) such as a polyanhydride prepared by the copolymerization of an alpha-olefin and maleic anhydride, gives resins which are cured by free radical means which have many of the foregoing properties but which are relatively expensive to prepare. The addition of a second olefinically unsaturated monomer containing at least one olefinic double bond capable of polymerization by free radical means and free of oxirane oxygen atoms, such as styrene, has been found unexpectedly and fortuitously to react to form a desirable homogeneous resin without adversely affecting the hardness and thermal stability properties of the resin. However, the addition of the olefinically unsaturated monomers free of oxirane oxygen atoms has been found to undesirably increase the curing time of the resinous system, resulting in a greater chance for volatilization, shrinkage and weight loss to occur.

It is the object of this invention to provide a method for increasing the rate of curing, i.e. decreasing the time to obtain a finally cured resinous product, for the compositions containing the less reactive copolymerizable olefinically unsaturated monooxirane free monomers such as styrene. It has been found in accordance with the invention that the rate of curing to a solid infusible resin can be increased for a liquid composition having a curing time in excess of ten minutes by the addition of water to said liquid composition, said liquid composition comprising (A) a solid compound containing at least three succinic anhydride groups and less than three conjugated double bonds when one of the conjugated double bonds is between the carbon atoms alpha to the carbonyl groups in a succinic anhydride group;
(B) an olefinically unsaturated monooxirane compound containing as its only functional groups a single oxirane oxygen atom and an olefinic double bond capable of being polymerized by free radical means; and
(C) an olefinically unsaturated monomer free of oxirane oxygen atoms and containing as its only functional groups at least one olefinic double bond capable of polymerization by free radical means, wherein the equivalent ratio of (A) to (B) is between °.25 and 2.0 with component (C) being present in an amount between 20 and 70 weight percent of the combined weight of (A) and (B); and wherein the amount of said water is between 0.1 weight percent of said components (A), (B) and (C) and that amount of water which reacts in said solution at room temperature to form a homogeneous solution.

The fact that the addition of water would decrease the rate of curing of the above defined compositions was quite unexpected since the addition of water to the above compositions without the olefinically unsaturated monooxirane free monomer resulted in a decrease in the rate of curing.

One of the components of the compositions of this invention is a solid compound containing at least three succinic anhydride groups and less than three conjugated double bonds when one of the conjugated double bonds is between the carbon atoms alpha to the carbonyl groups in a succinic anhydride group. In other words, one of the components of the compositions of this invention is a solid compound containing at least three anhydride groups where the carbon atoms alpha to the carbonyl groups in the anhydride are connected to each other through a bond selected from the group consisting of a single bond and a double bond and wherein said solid compound contains less than three conjugated double bonds when one of the conjugated double bonds is between the carbon atoms alpha to said carbonyl groups. By the term "conjugated double bonds" in this application is meant only conjugated carbon-to-carbon double bonds.

It is preferred that in the solid compound component containing at least three succinic anhydride groups, that the carbon atoms alpha to the carbonyl groups in the succinic anhydride be connected to each other through a single bond. In addition, the solid polyanhydride compounds are defined so as to exclude aromatic polyanhydrides where the carbon atoms alpha to the carbonyl groups in the anhydride group are part of an aromatic ring. Such aromatic polyanhydrides have been found unsuitable to form the compositions of this invention as they are substantially insoluble in the liquid monomeric organic oxirane compound.

The solid polyanhydrides for use in the compositions of this invention can be prepared in any suitable manner.

One suitable procedure is to polymerize an unsaturated derivative of succinic anhydride with itself or with another olefinic compound. By an unsaturated derivative of succinic anhydride is meant any organic compound comprising a succinic anhydride group and at least one carbon-to-carbon double bond. By a succinic anhydride group is meant the group represented by Formula I below:

FORMULA I

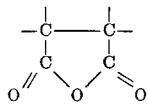

The carbon-to-carbon double bond can occur in the Formula I above between the carbon atoms alpha to the carbonyl groups in the succinic anhydride group or the carbon-to-carbon double bond can occur in the groups attached to the carbon atoms alpha to the carbonyl groups in the succinic anhydride group. For example, the solid polyanhydrides can be prepared by the homopolymerization of succinic anhydride derivatives represented by the general Formulas II through VII below.

FORMULA II

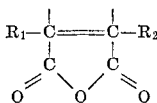

where $R_1$ is a member selected from the group consisting of hydrogen, halogen, a hydrocarbon radical and a substituted hydrocarbon radical; and $R_2$ is selected from the group consisting of hydrogen and halogen atoms. By the term "hydrocarbon radical" in this specification is meant any group of atoms consisting of carbon and hydrogen, such as alkyl, cycloalkyl, aryl, alkaryl and aralkyl. Unless otherwise indicated, the term "alkyl" is meant to include only saturated groups. The term "hydrocarbon radical" is therefore intended to substantially exclude olefinic unsaturation in the radicals unless otherwise indicated. By the term "substituted hydrocarbon radical" in the specification is meant where one or more atoms in the hydrocarbon radical have been exchanged for a halogen; —C≡N; —OR group where R is any hydrocarbon radical as defined above; or

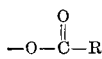

where R is any hydrocarbon radical as defined above. Examples of suitable anhydrides having the above formula are as follows:

maleic anhydride;
chloromaleic anhydride;
methylmaleic anhydride;
ethylmaleic anhydride;
hexylmaleic anhydride;
pentadecylmaleic anhydride;
octacosylmaleic anhydride;
4-propyl-8-methyl-eicosylmaleic anhydride;
cyclohexylmaleic anhydride;
phenylmaleic anhydride;
diphenylmaleic anhydride;
naphthylmaleic anhydride;
4-propyl-1-naphthylmaleic anhydride;
4-cyclohexyltridecylmaleic anhydride;
orthotolylmaleic anhydride;
paraethylphenylmaleic anhydride;
benzylmaleic anhydride;
dibromomaleic anhydride;
bromochloromaleic anhydride;
1-chloro-2-methylmaleic anhydride;
1-bromo-2-heptylmaleic anhydride;
1-chloro-2-heptadecylmaleic anhydride;
1-chloro-2-heptacosylmaleic anhydride;
1-chloro-2-cyclohexylmaleic anhydride;
1-bromo-2-phenylmaleic anhydride;
1-chloro-2-p-decylphenylmaleic anhydride;
1-chloro-2-heptylmaleic anhydride;
chloromethylmaleic anhydride;
3-bromooctylmaleic anhydride;
phenoxymethylmaleic anhydride;
phenoxydocosylmaleic anhydride;
6-pentanoxyoctylmaleic anhydride;
1-chloro-2(2-phenoxyethyl)maleic anhydride;
cyanoethylmaleic anhydride;
4-cyanononylmaleic anhydride; and
1-bromo-2-(3-cyanohexyl)maleic anhydride.

FORMULLA III

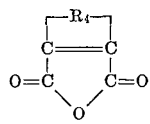

where $R_4$ is selected from the group consisting of a divalent hydrocarbon radical having between two and five cyclic carbon atoms and a substituted divalent hydrocarbon radical having between two and five cyclic carbon atoms. The total number of carbon atoms in $R_4$ can be between 3 and 36 and is preferably between 4 and 16. Examples of suitable compounds having the above Formula III are as follows:

1,2-dicarboxyliccyclobutene anhydride;
1,2-dicarboxyliccyclopentene anhydride;
1,2-dicarboxyliccyclohexene anhydride;
1,2-dicarboxyliccycloheptene anhydride;
1,2-dicarboxylic-4-chlorocyclopentene anhydride;
1,2-dicarboxylic-4-methylpentene anhydride;
1,2-dicarboxylic-4-octylcyclohexene anhydride;
1,2-dicarboxylic-5-octacosylcycloheptene anhydride;
1,2-dicarboxylic-5-cyanocyclohexene anhydride;
1,2-dicarboxylic-4-pentyl-5-octylcyclohexene anhydride; and
1,2-dicarboxylic-4(2-chloropentyl)-cyclohexene anhydride.

FORMULA IV

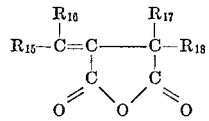

where $R_{15}$, $R_{16}$, $R_{17}$ and $R_{18}$ can be the same or different and are selected from the group consisting of hydrogen, halogen, a hydrocarbon radical and a substituted hydrocarbon radical. Examples of suitable compounds having the above Formula IV are as follows:

itaconic anhydride;
1,2-dicarboxylic-pentene-2 anhydride;
1,2-dicarboxylic-octene-2 anhydride;
1,2-dicarboxylic-tetradecene-2 anhydride;
1,2-dicarboxylic-eicosene-2 anhydride;
1,2-dicarboxylic-4-methyloctene-2 anhydride;
1,2-dicarboxylic-octadecene-2 anhydride;
2,4-dimethyl-3,4-dicarboxylic-pentene-2 anhydride;
1,1-dimethyl-1,2-dicarboxylic-octene-2 anhydride;
1,2-dicarboxylic-3-cyanohexene-2 anhydride; and
1,2-dicarboxylic-4-bromoeicosene-2 anhydride.

FORMULA V

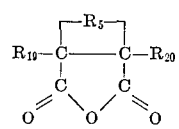

where $R_{19}$ and $R_{20}$ can be the same or different and are selected from the group consisting of hydrogen, halogen, a hydrocarbon radical, and a substituted hydrocarbon radical; and $R_5$ is a member selected from the group consisting of an unsaturated divalent hydrocarbon radical having between 3 and 5 carbon atoms wherein the unsaturation occurs between any two adjacent cyclic carbon atoms. The total number of carbon atoms in $R_5$ can be between 3 and 36 and is preferably between 4 and 10. Compounds having the structure according to Formula V above can be prepared by the Diels-Alder reaction between a conjugated diene and maleic anhydride. For example, cyclopentadiene and maleic anhydride react to form Nadic anhydride. Castor oil also reacts with maleic anhydride to form adducts corresponding to Formula V. Examples of other suitable compounds having the above Formula V include:

bicyclo(2.2.1)5-heptene-2,3-dicarboxylic anhydride;
cis-4-cyclohexene-1,2-dicarboxylic anhydride;
7-oxabicyclo(2.2.1)5-heptene-2,3-dicarboxylic anhydride;
4-methyl-4-cyclohexene-1,2-dicarboxylic anhydride;
bicyclo(2.2.2)1-octene-4,5-dicarboxylic anhydride; and
2-styryl-5-phenyl-1-cyclohexene-3,4-dicarboxylic
    anhydride.

FORMULA VI

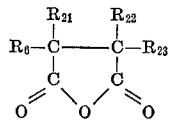

where $R_{21}$, $R_{22}$ and $R_{23}$ can be the same or different and are selected from the group consisting of hydrogen, halogen, a hydrocarbon radical, and a substituted hydrocarbon radical; and $R_6$ is a member selected from the group consisting of an unsaturated hydrocarbon radical and an unsaturated substituted hydrocarbon radical. Examples of suitable compounds having the above Formula VI are as follows:

propenylsuccinic anhydride;
butenylsuccinic anhydride;
hexenylsuccinic anhydride;
dodecenylsuccinic anhydride;
eicosenylsuccinic anhydride;
isopropenylsuccinic anhydride;
octenylsuccinic anhydride;
octadecenylsuccinic anhydride;
1-dodecenyl-2-chlorosuccinic anhydride;
1,2-dichlorododecenylsuccinic anhydride;
1,1-dipropyl-2-methyl-2-propenylsuccinic anhydride; and
1-octyl-1-bromo-2-butyl-2-dodecenylsuccinic anhydride.

FORMULA VII

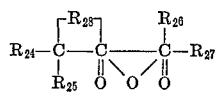

where $R_{24}$, $R_{25}$, $R_{26}$ and $R_{27}$ can be the same or different and are selected from the group consisting of hydrogen, halogen, a hydrocarbon radical and a substituted hydrocarbon radical; and $R_{28}$ is an unsaturated divalent hydrocarbon radical having four cyclic carbon atoms. The total number of carbon atoms in compounds having the Formula VII above can be between 9 and 40 and is preferably between 9 and 16. These compounds can suitably be prepared by the Diels-Alder reaction between a conjugated diene and itaconic and substituted itaconic anhydrides.

In the compounds represented by Formulas II, IV, V, VI and VII above, where R, $R_1$, $R_2$, $R_6$ and $R_{15}$ through $R_{27}$ are selected from the group consisting of hydrocarbon and substituted hydrocarbon radicals, they can have between 1 and 30 and preferably between 1 and 15 carbon atoms. The total number of carbon atoms per molecule for any particular compound represented by the Formulas VII through VI above can be between 4 and 40 and preferably between 4 and 20.

In addition to the homopolymerization of the unsaturated succinic anhydride compounds defined above, the solid polyanhydrides can be prepared by the copolymerization of an unsaturated succinic anhydride compound such as defined above with (1) each other, i.e. copolymerization of mixtures of unsaturated succinic anhydride compounds, or (2) with any other organic monoolefin compound. For example, the unsaturated succinic anhydride compounds can be copolymerized with olefinic compounds as represented by the general Formula VIII below:

where $R_3$ is selected from the group consisting of hydrogen, halogen, a hydrocarbon radical and a substituted hydrocarbon radical; and $x_1$ and $x_2$ are selected from the group consisting of hydrogen, halogen, a hydrocarbon radical, a substituted hydrocarbon radical and —OR where R is any hydrocarbon radical as defined above. The olefinic compound suitably has between 2 and 40 carbon atoms per molecule, preferably between 2 and 30, and more preferably between 6 and 20 carbon atoms per molecule.

The preferred olefinic compounds for use in forming the solid polyanhydride component of the compositions of this invention are those where $R_3$ in the above general formula is hydrogen and the sum of the carbon atoms in $x_1$ and $x_2$ is less than 28. The most preferred olefinic compounds are the aliphatic alpha monoolefins and, in particular, the straight-chain alpha monoolefins having between 2 and 30 carbon atoms per molecule.

The preferred copolymers are those prepared by the copolymerization of maleic anhydride with an alpha-olefinic hydrocarbon having between 2 and 30 carbon atoms per molecule, preferably between 4 and 20 carbon atoms per molecule.

It is understood that the term "olefin" is meant to include mixtures of monoolefins having between 2 and 40 carbon atoms per molecule, such as those obtained by the thermal or catalytic cracking of petroleum stocks. It is desirable that only one olefinic bond per molecule be present in the anhydride or the olefin since more than one double bond per molecule promotes gel formation and internal crosslinking. Minor amounts of diolefins, on the order of two percent or less, can however, be tolerated in the anhydride and olefin.

Examples of olefin compounds or mixtures of olefins suitable to form the solid polyanhydride components of the compositions of this invention include:

ethylene;
1-butene;
1-pentene;
2-methyl-1-butene;
3-hexene;
1-heptene;
3,3-dimethyl-1-pentene;
2-methyl-1-heptene;
1-nonene;
4,4-dimethyl-1-heptene;
2-decene;
2-methyl-4-propyl-3-heptene;
1-tridecene;
tetraisobutylene;
1-eicosene;
1-docosene;
1-hentriacontene;
styrene;
ethyl acrylate;
propylene;
2-butene;
2-pentene;
1-hexene;
4-methyl-1-pentene;
3-ethyl-2-pentene;
1-octene;
3,3-dimethyl-1-hexene;
4-nonene;
1-decene;
1-undecene;
1-dodecene;
1-tetradecene;
1-octadecene;
2-methyl-1-nonadecene;
1-heptacosene;
3-heptadecyl-2-eicosene;
methyl acrylate;
vinylchloride;
methylvinyl ether;
methylvinyl acetate;
allyl chloride;
acrylic acid;
p-chlorostyrene;
2,5-dichlorostyrene;
p-isopropylstyrene;
allyl laurate;
2-ethoxyethyl acrylate;
4-methoxystyrene;
octadecyl acrylate;
isopropyl acrylate;

2,2,3,3-tetrafluoropropyl acrylate;
vinylacetic acid;
vinyl-2-butoxyethyl ether;
vinylbutyrate;
vinyl-2-chloroethyl ether;
vinyl ethyl ether;
methyl vinyl ketone;
alphamethylstyrene;
2-methylbutene-1;
methyl methacrylate;
alpha-chlorostyrene;
2-chloroethyl methacrylate;
n-decyl methacrylate;
diethyl itaconate;
isopropenyl propionate;
2-ethoxyethyl methacrylate;
isopropenyl acetate;
methacroyl acetone;
octadecyl methacrylate;
isopropyl methacrylate;
vinyl acetate;
vinyl naphthalene;
acrolein;
p-bromostyrene;
cyclohexyl acrylate;
2-ethylhexyl acrylate;
allylisothiocyanate;
allylstearate;
4-ethoxystyrene;
p-nitrostyrene;
phenyl acrylate;
sodium acrylate;
vinyl benzoate;
vinyl n-butyl ether;
vinyl chloroacetate;
vinyl n-decanoate;
vinyl formate;
ethyl vinyl ketone;
2-methylpentene-1;
benzyl methacrylate;
n-butyl methacrylate;
alpha-chloroacrylonitrile;
2-cyanoacrylamide;
vinylidene cyanide;
vinylidene chlorobromide;
isopropenyl butyrate;
ethyl-alpha-bromoacrylate;
methacrolein;
methacrylic acid;
2-phenylethyl methacrylate;
sodium methacrylate;
2,2,3,3-tetrafluoropropyl methacrylate;
tetrahydrofurfuryl methacrylate;
vinylidene chloride;
beta-chlorostyrene;
diethyl maleate;
ethyl-crotonate;
methyl crotonate;
crotyl alcohol;
di-n-butyl fumarate;
di-2-ethylhexyl fumarate;
di-iso-octyl maleate;
dibutyl maleate;
crotonic acid;
crotyl bromide;
dilauryl maleatic;
fumaronitrile;
cinnamoyl chloride;
diamyl maleate;
diethyl fumarate;
di-iso-octyl fumarate;
dimethyl maleate;
citraconic acid and
beta,beta-dimethylacrylic acid.

One preferred form of the solid polyanhydride can be represented by the general formula:

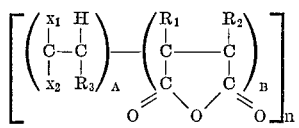

where $R_1$, $R_2$, $R_3$, $x_1$ and $x_2$ are as defined above; $n$ is an integer having a value from about 2 to about 100, or higher, and preferably from 2 to about 30; A is an integer having a value from 0 to 100; and B is an integer selected from the group consisting of 1 and 2.

In the copolymerization of the unsaturated succinic anhydride compounds with the olefin compounds as defined, at least 3 unsaturated succinic anhydride compounds must, of course, be incorporated therein in order to produce a solid polyanhydride having at least 3 succinic anhydride groups therein.

The copolymerization or polymerization can be conducted in any suitable manner. One suitable copolymerization procedure involves contacting the olefinic compound with the anhydride in a suitable solvent in the presence of a free radical producing catalyst, such as a peroxide. The ratio of the olefinic compound to the anhydride can vary over a wide range, but is generally between about 1:1 and 5:1, with preferred ranges between 1:1 to 3:1. The particularly preferred molar ratio of olefin to anhydride compound will depend to a large extent on the specific olefins and anhydrides employed. For example, for the copolymerization of aliphatic mono-alpha-olefins and maleic anhydride, the ratio of olefin to anhydride is desirably between about 1:1 and 3:1.

The temperature at which the copolymerization occurs is not critical and can generally vary between about 25° and 100° C. with a preferred reaction temperature between about 65° and 85° C. The lower limit on reaction temperature is determined by the temperature required to decompose the catalyst into free radicals. Thus, the lower reaction temperature will depend to a large extent on the catalyst employed. However, most free radical producing catalysts, such as the peroxides and others described below, are effective at temperatures as low as 25° C. unless a promoter, such as a ferrous, silver, sulfate or thiosulfate ion, is used, in which case much lower temperatures, i.e. −80° C., can be employed. The upper reaction temperature is determined by the boiling point of the components of the reaction mixture and the predominance of unwanted side reactions.

The reaction pressure should be sufficient to maintain the solvent in the liquid phase. Increased pressure, however, in addition to being an added expense, also promotes unwanted side reactions, such as polymerization of the olefinic compound. Pressures can therefore vary between about atmospheric and 100 p.s.i.g. or higher, but the preferred pressure is atmospheric.

The copolymers can be produced in any suitable solvent which at least partially dissolves both of the reacting components. Suitable solvents include, for example:

n-pentane;
n-octane;
tetrahydrofuran;
carbon tetrachloride;
methylcyclohexane;
toluene;
ethylbenzene;
xylene;
tetrachloroethylene;
n-amylacetate;
cyclohexanone;
methylorthotolylether;
methylethylketone; and n-hexane;
methylene chloride;
di-isopropyl ether;
cyclohexane;
n-propylacetate;
benzene;
cumene;
ethyl-n-butyrate;
di-n-butylether;
anisole;
bromobenzene;
acetone;
ethylbenzylether.

The catalyst to employ can be any free radical producing material well known in the art. Preferred catalysts are the organic peroxides, such as benzoyl, lauryl and tertiary butyl peroxides. Other suitable free radical producing materials include substituted azo compounds, such as alpha-alpha'-azobisisobutyronitrile.

The molecular weight of the polyanhydride component of the compositions of this invention can vary over a wide range. The inherent viscosity (which is a measure of molecular weight) of five grams of the polyanhydride per deciliter of acetone at 77° F. can suitably be between about 0.01 and 2 or more, and is preferably between about 0.03 and 0.95 deciliter per gram.

The composition of this invention also comprises an olefinically unsaturated monoxirane compound containing as its only functional group a single oxirane oxygen atom and at least one olefinic double bond capable of being polymerized by free radical means. By a functional group is meant a group such as an oxirane oxygen atom which would participate in the anhydride-monoepoxide crosslinking reaction, i.e. combine chemically with the anhydride, such as for example, —OH, —SH and —NH groups. By an oxirane oxygen atom is meant an oxygen atom directly connected to two carbon atoms which carbon atoms are connected to each other, i.e.

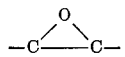

A monooxirane compound is frequently termed a monoepoxide. The monooxirane compound must also contain at least one, and preferably only one, olefinic double bond capable of being polymerized by free radical means. By free radical means in this application is meant thermal means, i.e., heat; ultraviolet light; radiation and well known free radical chemical initiators, such as organic peroxides, azo compounds, etc., as mentioned above. The liquid monooxirane compounds are preferred. Suitable ethylenically unsaturated monooxirane compounds are those which contain, in addition to the single oxirane oxygen, at least one terminal $CH_2=C<$ grouping.

The monooxirane compounds used in the compositions of this invention are the alpha-olefinically unsaturated monooxirane compounds which contain substituents directly connected to the beta-carbon atom of the alpha-olefin, which substituents result in a net electron withdrawal from the alpha-olefin double bond. In other words, the alpha-olefin double bond is activated for polymerization by substituents or groups which effect an electron withdrawal from the olefinic double bond. Electron withdrawing groups are well known in the art and include, for example, halogen;

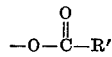

where R' is any organic radical;

where R' is any organic radical; $—C\equiv N$; and aromatic organic radical;

$—CH=CH_2$; and

where R' is any organic radical. Substituents or groups which donate electrons are undesirable but can be used if the net effect of the two substituents on the beta-carbon atom of the alpha-olefin is to effect an electron withdrawal and result in a monomer which is capable of polymerization by free radical means. Substituents which donate electrons are also well known in the art and include, for example, —OR', where R' is any organic radical; —$CR_{30}R_{31}R_{32}$, where $R_{30}$, $R_{31}$ and $R_{32}$ are selected from the group consisting of hydrogen and any organic radical. For example,

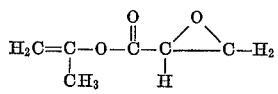

contains an electron donating group (—$CH_3$) and an electron withdrawing group

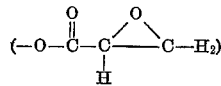

of about equal power on the beta-carbon atom. This compound is therefore unsuitable because the net effect is that there is no electron withdrawal from the double bond. In a similar manner, allyl glycidyl ether, i.e.,

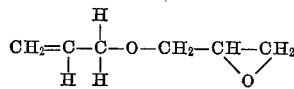

is not a suitable monooxirane compound for the compositions of this invention since the

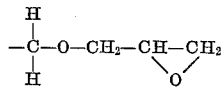

group donates electrons to the double bond. On the other hand, compounds having the general formula:

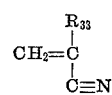

where $R_{33}$ is an alkyl group containing a single oxirane oxygen atom, readily polymerize even though $R_{33}$ is an electron donating group because $—C\equiv N$ is such a strong electron withdrawal group that the net effect, i.e. the summation of the electron donating power of the $R_{33}$ group and the electron withdrawal power of the $—C\equiv N$ group is that electrons tend to be withdrawn from the olefinic double bond, thus activating it for polymerization. As a further example, a compound such as:

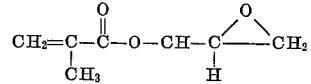

will readily polymerize even though the beta-carbon atom contains the electron donating methyl group, since again the electron withdrawal power of the

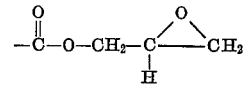

group is greater than the electron donating power of the $CH_3$ group.

The preferred monooxirane compounds are the alpha-olefinically unsaturated terminal monoepoxides represented by the general formula:

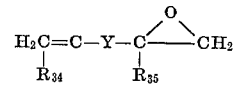

where $R_{35}$ is selected from the group consisting of hydrogen and a saturated hydrocarbon radical having between 1 and 10 carbon atoms; where $R_{34}$ is selected from the group consisting of hydrogen; halogen; $—C\equiv N$;

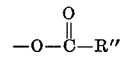

—COOR", where R" is any saturated hydrocarbon radical having between 1 and 10 carbon atoms; and

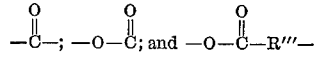

where R" is as defined when Y is selected from the group consisting of

where R''' is any divalent hydrocarbon radical having between 1 and 20 carbon atoms; and where $R_{34}$ is selected from the group consisting of a saturated hydrocarbon radical having between 1 and 10 carbon atoms; hydrogen; halogen; $—C\equiv N$;

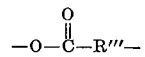

—COOR", where R" is as defined; and

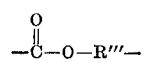

where R''' is as defined when Y is $$-\overset{O}{\underset{\|}{C}}-O-R'''-$$

where R''' is any divalent hydrocarbon radical having between 1 and 20 carbon atoms.

In general, the total number of carbon atoms in the monooxirane compound is suitably between 4 and 30, and preferably between 4 and 10 carbon atoms per molecule. The total number of carbon atoms in the preferred monooxirane compound should be such that the compound is liquid at about room temperature. Examples of suitable compounds include, but are not limited to, glycidyl methacrylate;
glycidyl acrylate;
glycidyl propacrylate;
3,4-epoxy butene-1;
3,4-epoxy-3-chloro butene-1;
3-keto-4,5-epoxy pentene-1;
2-methyl-3-keto-4,5-epoxy pentene-1;

2-cyano-3-keto-4,5-epoxy pentene-1;
3-keto-4-methyl-4,5-epoxy pentene-1;
epoxy ethyl propenoate

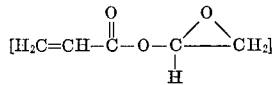

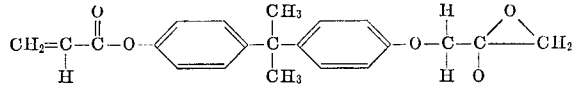

2-methyl-2,3-epoxy propyl acrylate;
2-decyl-2,3-epoxy propyl acrylate;
4-methyl-4,5-epoxy pentyl acrylate;
4-methyl-4,5-epoxy pentyl methyl acrylate;
2-methyl-2,3-epoxy-propyl methyl acrylate;
vinyl 3,4-epoxy butanoate

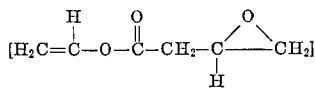

vinyl 3-methyl-3,4-epoxy butanoate; and
vinyl 7,8-epoxy octanoate.

The compositions of this invention also comprise a second olefinically unsaturated monomeric compound free of oxirane oxygen atoms and containing as its only functional groups at least one olefinic double bond capable of polymerization by free radical means. The olefinically unsaturated monomer should be one which attains a maximum exotherm by the "Standard 180° F. Exotherm Curve" test in a time of more than 10 minutes when cured in a dry polyanhydride-unsaturated monooxirane-unsaturated monomer system. This "Standard 180° F. Exotherm Curve" test is fully described in the "Handbook of Reinforced Plastics of the Society of the Plastics Industry, Inc. (SPI), 1964, page 51, published by Reinhold Publishing Corporation, New York." In other words, the cure time in a dry three component system should exceed 10 minutes, the cure time being measured by the time necessary to attain a maximum exotherm in the SPI "Standard 180° F. Exotherm Curve" test. If the curing time is less than 10 minutes, the effect of water to increase the rate of reaction is not as great. This second olefinically unsaturated compound must be free of oxirane oxygen atoms and other functional groups which would participate in the anhydride-monoepoxide crosslinking reaction, i.e. combine chemically with the anhydride or epoxide, such as for example, —OH, —SH, and —NH groups. The preferred olefinically unsaturated compounds are those containing between 2 and 20 carbon atoms and between 1 and 2 olefinic double bonds capable of polymerization by free radical means. More preferably, the olefinically unsaturated monomeric compounds are those that have between 2 and 10 carbon atoms which are liquid at or about room temperature. It is essential that these olefinically unsaturated monomeric compounds form a liquid solution with the selected solid polyanhydride and the selected olefinically unsaturated monooxirane compound at a temperature less than the cure temperature of the three component mixture.

Olefinically unsaturated monomeric compounds which polymerize by a free radical mechanism are well known in the art and are generally alpha-olefinically unsaturated compounds which contain substituents directly connected to the beta-carbon atom of the alpha-olefin, which substituents in a manner similar to the discussion with respect to the unsaturated monooxirane compound above results in a net electron withdrawal from the alpha-olefin double bond. In other words, the alpha-olefin double bond is activated for polymerization by substituents or groups which effect an electron withdrawal from the olefinic double bond. Electron withdrawing groups are well known in the art and include, for example, halogen;

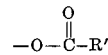

where R' is any organic radical; —C≡N; an aromatic organic radical;

CH=CH₂; and

where R' is any organic radical. Substituents or groups which donate electrons are undesirable but can be used if the net effect of the two substituents on the beta-carbon atom of the alpha-olefin is to effect an electron withdrawal and result in a monomer which is capable of polymerization by free radical means. Substituents which donate electrons are also well known in the art and include, for example, —OR', where R' is any organic radical;

where $R_{30}$, $R_{31}$ and $R_{32}$ are selected from the group consisting of hydrogen and any organic radical.

The olefinically unsaturated compounds defined above are capable of polymerization by free radical means to produce a homopolymer. In addition, the olefinically unsaturated monooxirane compounds defined above are also capable of polymerization by free radical means to produce a homopolymer. When two olefinically unsaturated compounds both of which are capable of homopolymerization by free radical means are admixed and subjected to a free radical polymerization, a mixture of homopolymers, a copolymer, or a mixture of both can be obtained depending on the concentration of the components in the mixture and their reactivity ratios. Fred W. Billmeyer, Jr., in his textbook of Polymer Science, published by Interscience in 1962, defines the monomer reactivity ratios $r_1$ and $r_2$ as the ratios of the rate constants for a given radical adding its own monomer to its adding to the other monomer. In other words, a reactivity ratio for a given monomer can be defined as the ratio of the reaction rate constant to the formation of polymer of the given monomer with itself, divided by the reaction rate constant to the formation of copolymer of the given monomer with a second added monomer. If $r_1$ is greater than one, this means that monomer one prefers to add to itself, while if $r_1$ is less than one, this means that a given monomer prefers to add to the second added monomer. In the compositions of the subject file the situation is further complicated by the fact that, while the olefinically unsaturated monomeric compound free of oxirane oxygen atoms is capable of homopolymerization or copolymerization with the olefinically unsaturated monooxirane compound, the olefinically unsaturated monooxirane compound is additionally capable of reacting and does react with the solid polyanhydride to form a crosslinked polymer. It has been found quite unexpectedly that instead of the olefinically unsaturated compound homopolymerizing or forming a separate copolymer solid with the olefinically unsaturated monooxirane compound, a single homogeneous solid resin is formed on curing provided the components of the composition form a liquid solution at a temperature within the gel time. While it is not certain, it is beleived that the unusual and unexpected results are obtained because the bulk of the curing reactions occur in the gel phase. The presence of a gel phase occurs on an initial crosslinking of the polyanhydride and the saturated monooxirane compound. The three components of the composition of this invention must form a liquid solution before this gel phase occurs in order to form a homogeneous solid resin on final curing. By a homogeneous resin is meant a resin where the components are combined chemically with each other and which has a uniform structure throughout, that is, a homogeneous resin is one which is soluble to less than ten weight percent of the added olefinically unsaturated oxirane oxygen free monomer in a solvent, such as acetone, for the homopolymer of said monomer over a period of twenty-four hours. It is believed that the presence of the gel phase allows sufficient time for the various crosslinking and copolymerization reactions to occur. The preferred olefinically unsaturated compounds for use in the compositions of this invention are those having reactivity ratios less that three at 60° C. and more preferbaly, the olefinically unsaturated monomers should have reactivity ratios less than one.

The preferred olefinically unsaturated monomeric compounds are those selected from the class consisting of:

(1) Vinyl monomers having the general formula:

$$H_2C=\underset{H}{\overset{\;}{C}}-X$$

where $x$ can be any aryl group having between 1 and 3 rings; halogen;

$$-\overset{O}{\underset{\|}{C}}-NH_2$$

—C≡N; —OR$_{36}$, where R$_{36}$ is any hydrocarbon radical having between 1 and 20 carbon atoms which can be substituted by halogen and —C≡N groups; and $$-O-\overset{O}{\underset{\|}{C}}-R_{36}$$

where R$_{36}$ is as defined;

(2) Beta substiuted propylenes having the general formula:

$$H_2C=\underset{Z}{\overset{\;}{C}}-CH_3$$

where Z is selected from the class consisting of —C≡N; phenyl; and $$-\overset{O}{\underset{\|}{C}}-NH_2$$

and (3) Vinylidene compounds having the general formula:

$$H_2C=\underset{R_{38}}{\overset{R_{37}}{C}}-R_{38}$$

where R$_{37}$ and R$_{38}$ can be the same or different and are selected from the class consisting of —C≡N and halogen.

The styrene-type compounds, such as styrene, alpha-methyl styrene and p-chlorostyrene, are particularly preferred.

Examples of suitable olefinically unsaturated monomeric compounds include:

C$_6$H$_5$CH=CH$_2$ (styrene)
alpha-methyl styrene

CH$_2$=CH—$\overset{O}{\underset{\|}{C}}$—NH$_2$ (acrylamide)

CH$_2$=CH—C≡N (acrylonitrile)
CH$_2$=CH—O(CH$_2$)$_{11}$CH$_3$ (vinyl dodecyl ether)
CH$_2$=CH—O—(CH$_2$)$_3$CH$_3$ (vinyl butyl ether)

CH$_2$=$\underset{CH_3}{\overset{\;}{C}}$—C≡N (methacrylonitrile)

CH$_2$=$\underset{CH_3}{\overset{\;}{C}}$—$\overset{O}{\underset{\|}{C}}$—NH$_2$ (methacrylamide)

CH$_2$=CCl$_2$ (vinylidene chloride)
CH$_2$=C(C≡N)$_2$ (vinylidene cyanide)

CH$_3$$\overset{O}{\underset{\|}{C}}$—NH—C$_6$H$_5$—CH=CH$_2$ (p-acetyl aminostyrene)

CH$_2$=CHCHO (acrolein)

CH$_2$=$\underset{CH_3}{\overset{\;}{C}}$—$\overset{O}{\underset{\|}{C}}$—NH—C$_6$H$_4$—OCH$_3$ (N-(p-anisyl)methacrylamide)

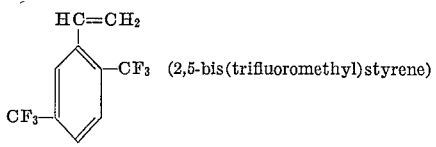  (2,5-bis(trifluoromethyl)styrene)

BrC$_6$H$_4$CH=CH$_2$ (m- and p-bromostyrene)
ClC$_6$H$_4$CH=CH$_2$ (m- and p-chlorostyrene)
CH$_2$=CH—CH=CH$_2$ (butadiene)

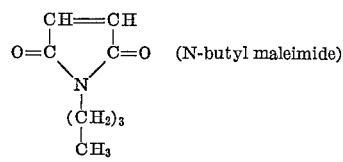 (N-butyl maleimide)

(2-chloro-1,3-butadiene);

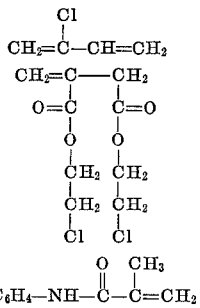

ClC$_6$H$_4$—NH—$\overset{O}{\underset{\|}{C}}$—$\underset{CH_3}{\overset{\;}{C}}$=CH$_2$ (N-(p-chlorophenyl)methacrylamide);
4-chloro-1-vinylnaphthalene;
6-chloro-2-vinylnaphthalene;
p-cyanostyrene;
1-dioxy-1-methacrylamido-D-glycital;
1-acrylamido-1-dioxy-D-glycital;
di-n-butyl itaconate;
di-b-chloroethyl itaconate;
2,3-dichloro-1,3-butadiene;
2,5-dichlorostyrene;
1,1-dihydroperfluorobutyl acrylate;
N-(1,1-dihydroperfluorobutyl)-N-ethyl acrylamide;
p-dimethylaminostyrene;
dimethyl itaconate;
2,4-dimethyl-6-vinyl-s-triazine;
N,N-divinylaniline;
divinyl ether;
divinyl sulfide;
divinyl sulfone;
divinyl tartrate;
N-ethyl-N,1,1-dihydroperfluorobutylacrylamide;
N-ethyl methacrylamide;
ethyl methacrylylaminoacetate;
ethyl vinyl oxalate;
5-ethyl-2-vinylpyridine;
5-ethyl-2-vinylpyridine-N-oxide;
N-ethyl-N'-vinylurea;
ethyl vinyl sulfide;
2-fluorobutadiene;
N-(m-fluorosulfonylphenyl)acrylamine;
N-(m-fluorosulfonylphenyl)methacrylamide;

fumaronitrile;
p-iodostyrene;
methyl 1-chloracrylate;
alpha-methyl styrene;
m-nitrostyrene;
pentachlorostyrene;
N-p-tolylmethacrylamide;
vinyl acetate;
N-vinyl carbazole;
vinyl ethyl sulfide;
vinyl isothiocyanate; and isopropenyl isocyanate;
p-methoxystyrene;
N-methyl methacrylamide;
p- and m-methyl styrene;
2-methyl-4-vinyl pyridine;
N-phenyl methacrylamide;
3-trifluoromethylstyrene;
vinyl bromide
vinyl chloride;
1-vinyl-3-ethylurea;
vinyl isocyanate As noted above in order to obtain a finally cured resin which is homogeneous and grain-free the uncured compositions must form a liquid solution at a temperature less than the curing temperature and preferably should form a liquid solution at about room temperature By a temperature less than the curing temperature or below the cure temperature is meant a temperature where it requires less time for the components to form a liquid solution than to form a gel structure from the reaction of the polyanhydride with the monooxirane compound. That is, it requires a certain amount of time at any given temperature for any particular defined polyanhydride and defined olefinically unsaturated monomers to form a liquid solution or to react at least partially to form a gel structure. The formation of a gel structure substantially halts further solution of any remaining solid components and a finally cured resin having a grainy structure with inferior physical and chemical properties will result. As the temperature is increased, the rate of solution increases, but usually the rate of reaction to form the gel structure increases even faster. It is only essential that the components of the compositions of this invention be capable of forming a liquid solution at some temperature and in a time less than that required for the same composition to form a gel at the same temperature. The polyanhydride component is a solid at room temperature. The olefinically unsaturated monooxirane compound and the olefinically unsaturated monomeric compound free of monooxirane oxygen atoms are normally liquids at room temperature, although they can, in some instances, be solids. At least one of the olefinanically unsaturated monomeric components must be sufficiently low melting that it will liquify and form a liquid solution with the solid polyanhydride and remaining olefinically unsaturated component before a gel strucforms, i.e. at a temperature less than the cure temperature. It is, of course, preferred that at least one of the olefinically unsaturated components be liquid at room temperature and be used in an amount sufficient to dissolve the remaining components of the composition to form a liquid solution at room temperature. More preferably, both of the olefinically unsaturated components are liquids at room temperature, which liquids must, of course, be mutually soluble, and capable of solubilizing the solid polyanhydride employed.

In general, the molar ratio of the polyanhydride to monoepoxide compound to employ in the compositions of this invention can vary over a wide range. The specific ratio to employ with any given monoepoxide is determined, first of all, by whether a liquid solution of the polyanhydride in the monoepoxide-olefinically unsaturated monomeric oxirane oxygen free compound is obtained at a temperature below the curing temperature. The liquid solution hardens at least in part due to a crosslinking reaction occasioned by the interaction of the anhydride and epoxide groups to form ester linkages. Ether linkages also form due to the interaction of several epoxide groups. Since the polyanhydride has many reactive anhydride groups per molecule while the monooxirane compound has only one reactive epoxy group per molecule, the ratio of the anhydride to epoxy compound (more simply the A/E ratio) is usually spoken of and given as an equivalent ratio. Theoretically, one equivalent of the polyanhydride compound can react with one equivalent of the monooxirane compound. One equivalent of the monooxirane compound is, of course, one mole since there is only one oxirane oxygen atom per molecule. The anhydride equivalent of the polyanhydride is defined as the average number of anhydride groups per molecule. The anhydride equivalency of the polyanhydride used in the compositions of this invention is at least two, i.e. the polyanhydride has at least two anhydride groups per molecule. The anhydride to epoxide equivalent ratio, i.e. the A/E ratio, can suitably be between about 0.25:1 and 2:1, and preferable between 0.5:1 and 1.5:1, for the preparation of compositions having the best physical and chemical properties.

The amount of the olefinically unsaturated monomeric compound which is free of oxirane oxygen atoms can vary between 20 and 70 parts per hundred parts of resin by weight (phr.) with preferred amounts between 40 and 60 weight (phr.) with the exact amount depending on the properties desired in the finished product. By "resin" is meant the polyanhydride-monooxirane mixture. The maximum amount of any particular unsaturated monomer to employ will depend upon its compatibility in the finished product. That is, as noted above, the olefinicially unsaturated monomer must form a homogeneous liquid solution with the solid polyanhydride and monooxirane components before the time necessary for a gel structure to form. However, if the concentration of the olefinically unsaturated oxirane oxygen free monomer is too high, a portion of it will form as separate solid polymer phase and thus fail to give a homogeneous solid polymer product, as desired. When this occurs, the product is grainy in appearance and has inferior properties. For example, styrene has been found to form a liquid solution with various polyanhydride-monoepoxide compositions in amounts between 1 and 70 phr. In all cases, the styrene was compatible for the product was a homogeneous solid. On the other hand, while vinyl acetate forms a liquid solution with a hexene-1-maletic anhydride copolymer-glycidyl methacrylate composition, it (vinyl acetate) is only compatible in amounts of 10 phr. or less when castings are made or 50 phr. or more when laminates are made. With other polyanhydride-monoepoxide systems as defined, more or less vinyl acetate may be compatible. In all cases, the concentration of the unsaturated oxirane oxygen free monomer must fall within the limits defined above.

It has been found that the above described liquid solutions of a polyanhydride, an olefinically unsaturated monoepoxide and an olefinically unsaturated compound free of oxirane oxygen atoms are capable of being cured thermally in relatively short periods of time to a solid homogeneous infusible resin having excellent hardness and volume resistivity properties, whereas, liquid solutions of the same polyanhydride and saturated monoepoxides take much longer thermally to result in finished resins which do not possess the desired hardness characteristics of the new compositions of this invention.

The curing of the liquid solutions described above is believed to proceed, not only by the anhydride-epoxide crosslinking reaction, but by polymerization reactions involving the olefinically unsaturated components. The crosslinking reaction proceeds, as noted, by the interaction of an anhydride function of the polyanhydride with the epoxide function of the unsaturated monooxirane compound while the polymerization reactions proceed in some unknown sequence and manner through the interaction of the olefinic double bonds of the olefinically unsaturated components. The curing temperature has been found to be critical in order to obtain finally cured resins which have a hardness in excess of 80 on the Barcol 935 hardness scale. The use of curing temperatures less than 80° C. results in finally cured resins which are solid, but have inferior hardness properties. Curing temperatures are therefore suitably between 80° C. and 250° C., preferably between 90° C. and 200° C. for times between 0.1 and 50 hours, preferably between 2 and 20 hours, the higher temperatures requiring the shorter curing times. The time required to reach the desired curing temperature is not considered part of the curing time. Curing can also occur in stages, if desired, that is, a first stage curing at a relatively low temperature of between 50° C. and 100° C. for between 1 and 30 hours to obtain a hard resin which is then post-cured in a second stage at a temperature between 90° C. and 200° C. for between 2 and 30 hours to obtain a finished very hard resin. The one-stage curing is preferred since it requires less time to result in a finished product.

The addition of water in small amounts to the above thermally cured composition results in an increase in the rate of curing, i.e. a decrease in the time required for the liquid solution to form a solid infusible resin, but the curing times are within the ranges set forth above. The amount of water to employ is at least 0.1 weight percent based on the weight of the polyanhydride-monooxirane solution. The maximum amount of water is that amount which will react at room temperature in the polyanhydride-monooxirane-unsaturated monomer system to form a homogeneous solution. For example, when styrene is the unsaturated monooxirane free monomer employed, the amount of water can suitably be between 0.1 and 0.75, preferably between 0.3 and 0.6, weight percent of the polyanhydride-monooxirane-styrene solution. Anyone with ordinary skill in the art can easily ascertain by a few simple experiments what the maximum water content is for the particular curable liquid solution employed. Generally, the amount of water is between 0.1 and 1 weight percent of the curable composition with preferred amounts between 0.2 and 0.6 weight percent.

The water is preferably not added first to the solid polyanhydride since this renders the polyanhydride much more difficult to dissolve in the monooxirane compound. The water is preferably added to the liquid solution of the solid polyanhydride in the unsaturated monooxirane compound either before, after or during the addition of the olefinically unsaturated monomer free of oxirane oxygen atoms. The solution will initially be cloudy but will clear to form a homogeneous solution as the water reacts.

If it is preferred to promote the curing with a free radical catalyst such as an organic peroxide to be defined below, the water can be added before or with the free radical catalyst.

If it is preferred to promote the curing with a tertiary amine to be defined below either alone or in addition to the free radical catalyst, then the water can be added before the addition of the tertiary amine or simultaneously with the tertiary amine.

While the curing reaction will proceed thermally, other free radical producing means can also suitably be employed. Thus, the curing reaction can be promoted by ultraviolet radiation, a Van de Graaff accelerator, radium or other means which give off atomic particles. Preferably, the free radical initiator is an organic peroxide such as benzoyl, lauroyl and tertiary butyl peroxide. Other suitable free radical producing materials include substituted azo compounds such as alpha-alpha-azo bis-isobutyronitrile and other azo compounds such as those disclosed in U.S. Pat. No. 2,551,813 to Pinkney.

The function of the peroxide is to initiate the polymerization of the unsaturated monooxirane-free monomer. This reaction is exothermic and promotes the crosslinking of the monooxirane compound and polyanhydride. The peroxides or other free radical means also promote the homo and copolymerization of the unsaturated bonds in the oxirane compound. The amount of the free radical initiator varies depending on the type of initiator employed. In the case of organic peroxides the amount of free radical initiator can suitably be between 0.1 and three weight percent of the liquid curable solution, i.e. the polyanhydride-monooxirane-unsaturated monooxirane free monomer solution, with preferred amounts between 0.5 and 2 weight percent. Amounts greater than three weight percent can be employed but have no added advantage.

The addition of water in amounts as described above also serves to increase the curing rate of peroxide catalyzed systems. This effect will be more fully described in the examples to be given below.

It is at times desirable to hasten the decomposition of the organic peroxides when employed or other source of free radical means. As is known, various compounds such as amines activate the peroxide catalysts by causing them to decompose at lower temperatures. Suitable in this regard are the tertiary amines such as N,N-dimethyl aniline, tri-n-decylamine, pyridine, 3-picoline, phenotriazine, phenazine and the like.

The tertiary amines which are useful in the compositions of this invention are those which are soluble and unconjugated. That is, the tertiary amines can be any soluble organic compound containing at least one tertiary amine group which is free of conjugation with respect to other tertiary amine groups, said organic compound having one of its nitrogen atoms present only as part of the tertiary amine groups. By free of conjugation with respect to other tertiary amine groups is meant that the nitrogen atom of one tertiary amine group is not connected to a nitrogen atom of another tertiary amine group through alternate single and double bonded atoms. The preferred tertiary amines are the monoamines containing only C, H and N. By a soluble tertiary amine is meant substantially completely soluble in the solution of the particular polyanhydride-olefinically unsaturated monoepoxide system employed.

One suitable class of tertiary amines can be represented by the general formula:

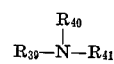

where $R_{39}$, $R_{40}$ and $R_{41}$ can be the same or different and can be selected from the group consisting of a hydrocarbon radical as defined above having between 1 and 37 carbon atoms, and a substituted hydrocarbon radical as defined having between 1 and 37 carbon atoms; and wherein the sum of the carbon atoms in $R_{39}$, $R_{40}$ and $R_{41}$ is less than 40; and wherein the term "alkyl" for $R_{39}$, $R_{40}$ and $R_{41}$ includes both saturated and unsaturated groups. Examples of suitable tertiary amines having the above formula include:

trimethylamine;
triethylamine;
N,N-dimethylaniline;
tri-n-hexylamine;
tri-n-heptylamine;
triphenylamine;
tri-n-decylamine;
alpha-methylbenzyldimethylamine;
N,N-diethylaniline;
N-ethyl-N-phenylbenzylamine;
N,N-dimethylbenzylamine;
N,N-diethylallylamine;
N,N-dimethylcyclohexylamine;
N,N-diphenylmethylamine;
N-methyl-N-phenylbenzylamine;
N,N-dimethyl-p-nitrosoaniline;
meta-diethylaminophenol;
dimethylaminomethylphenol;
N,N-diethyldodecylamine;
tridimethylaminomethylphenol;
dimethylaminoethyl methacrylate;
N,N-di-n-propylaniline;
N,N-diethyl-o-toluidine;
N,N-diethyl-p-toluidine;
N,N-dimethyl-1-naphthylamine;
N,N-diethyl-1-naphthylamine;
N-ethyl-N-methylaniline;
p-bromo-N,N-dimethylaniline;
p-bromo-N,N-diethylaniline;
N,N-dimethyl-m-toluidine;
N,N-diethyl-m-toluidine;
N,N-diethyl-2,4-dimethylaniline;
p-chloro-N,N-diethylaniline;
N,N-diethyl-2,5-dimethylaniline;
N-benzyl-N-ethyl-m-toluidine;
N,N-alpha-trimethylbenzylamine;
tri-n-propylamine;

tri-n-butylamine;
tri-isopentylamine;
tri-pentylamine;
N,N-dimethyloctadecylamine;
N,N-dimethyl-2-ethylhexylamine;
trioctylamine; and
tridodecylamine.

The preferred tertiary amines are the monoamines wherein the nitrogen atom of the amine group is one of the ring atoms in an aromatic ring. Particularly preferred are the single ring monotertiary amines wherein the nitrogen atom of the amine group is one of the ring atoms in an aromatic ring, i.e. the pyridine and substituted pyridines as represented by the formula:

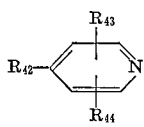

where $R_{42}$, $R_{43}$ and $R_{44}$ can be the same or different and are selected from the group consisting of hydrogen, a hydrocarbon radical as defined above having between 1 and 10 carbon atoms, and a substituted hydrocarbon radical as defined having between 1 and 10 carbon atoms; and wherein the term "alkyl" includes both saturated and unsaturated groups. Examples of suitable tertiary amines having the above formula include:

pyridine;
3-ethylpyridine;
2-benzylpyridine;
4-phenylpyridine;
2-chloropyridine;
2-picoline;
4-picoline;
3,5-dimethylpyridine;
2,6-dimethylpyridine; and
2-allylpyridine;
4-ethylpyridine;
2-isopropylpyridine;
3-bromopyridine;
vinylpyridine;
3-picoline;
3,5-dicyanopyridine;
2,4-dimethylpyridine;
2,4,6-trimethylpyridine.

It has been found that the use of conjugated tertiary amines, such as phenazine, results in a finally cured resin having thermal stability properties which are only slightly better than the properties of the finally cured resin cured solely by thermal means.
Examples of other suitable tertiary amines include:

N,N-diethyl-m-phenetidine;
N,N,N',N'-tetramethylmethylene diamine;
N,N,N',N'-tetramethyl-1,3-butane diamine;
N,N,N',N'-tetraethylethylene diamine;

| triethylene diamine; | quinoline; |
| quinaldine; | 2,6-dimethylquinoline; |
| 2-chloroquinoline; | isopyrrole; |
| oxazole; | isothiazole; |
| 1,2,3,4-trioxazole; | 1,2,4-oxazine; |
| 1,4-oxazine; | indolenine; |
| 4-pyridine; | indoxazine; |
| benzoxazole; and | acridine. |

In general, the amount of soluble tertiary amine to employ will be between 0.01 and 20 parts by weight of amine per 100 parts of the polyanhydride-monoepoxide unsaturated monooxirane-free monomer solution. The preferred concentration of tertiary amine is usually between 2 and 5 parts by weight per 100 parts of polyanhydride-monoepoxide unsaturated monooxirane - free monomer solution.

The method of addition of the tertiary amine accelerators when employed is critical. They must be added to the mixture of polyanhydride and monoepoxide after the polyanhydride is dissolved in the monoepoxide since it normally takes longer for the solution of the polyanhydride in the monoepoxide than for the amine accelerators to harden the mixture. Consequently, if the amine is added first to the monoepoxide and the polyanhydride added to this mixture the composition may harden before all of the polyanhydride is dissolved, and a grainy composition with inferior chemical and physical properties will result. The addition of the unsaturated monooxirane free monomer, when a liquid, generally reduces the viscosity and aids in the solution of the polyanhydride. It is preferred, and may be necessary for the higher A/E ratios, that the unsaturated monooxirane free monomer be added before the addition of the tertiary amine, depending on how readily the monomer dissolves in the solution.

The invention will be further described with reference to the following specific examples.

In the examples to follow, a polyanhydride compound was prepared by the copolymerization of maleic anhydride and hexene-1. This copolymer was prepared by reacting hexene-1 and maleic anhydride in a molar ratio of about 2:1 in a liquid phase in the presence of a mutual solvent at a temperature between 60° and 100° C., using as a catalyst between two and three weight percent of benzoyl peroxide based on the maleic anhydride. The copolymer was then separated from the solvent and any residual catalyst and then dried. Infrared analysis and nuclear magnetic resonance showed the hexene-1 and maleic anhydride to have combined in a 1:1 molar ratio. The inherent viscosity of the copolymer measured by dissolving the copolymer in a ratio of 5 grams to a deciliter of acetone measured at 77° F. was between 0.05 and 0.15.

EXAMPLE 1

In the run for this example, a sufficient amount of hexene-1-maleic anhydride copolymer prepared as described above and having an inherent viscosity of 0.09 was admixed with glycidyl methacrylate to form a solution having an A/E ratio of 1.5. Styrene, in the amount of 60 weight percent, based on the polyanhydride-monooxirane solution, was added to form a homogeneous liquid solution. It required 336 hours to form a solid infusible resin from this solution at room temperature (28° C.). The finally cured product was cloudy in color.

A series of runs was made with curing at room temperature adding water, 3-picoline, and/or benzoyl peroxide to the composition of Example 1. The results of this series of experiments is shown in Table I below.

TABLE I

| Example No. | Weight percent | | | Cure time,[1] hours | Color |
|---|---|---|---|---|---|
| | water | 3-picoline | Benzoyl peroxide | | |
| 1 | 0 | 0 | 0 | 336 | Cloudy. |
| 2 | 0.5 | 0 | 0 | 119 | Milk white. |
| 3 | 0 | 3 | 0 | 4¾ | Light amber. |
| 4 | 0.5 | 3 | 0 | 3 | Light straw. |
| 5 | 0 | 0 | 1 | 72 | Milky white. |
| 6 | 0.5 | 0 | 1 | 44½ | Do. |
| 7 | 0 | 3 | 1 | 4¾ | Medium amber. |
| 8 | 0.5 | 3 | 1 | 2½ | Light straw. |

[1] Curing at room temperature and not by SPI curve.

Referring to Table I, it can be seen that the addition of 0.5 weight percent water decreased the curing time to 119 hrs. (Example 2); the addition of benzoyl alone (Example 5) decreased the curing time to 72 hrs.; while the addition of 3-picoline alone reduced the curing time to 4 hrs. (Example 3). The addition of water in the amount of 0.5 weight percent decreased the curing time still further for the amine curing system (Example 4); the peroxide cured system (Example 6) and the peroxide-amine cured system (Example 8). Surprisingly, the addition of both 3-picoline and benzoyl peroxide in a dry system was no more effective than the 3-picoline alone (compare Examples 3 and 7). The addition of water also had the desirable effect of lightening the color of the amine cured resin (compare Examples 3 and 4, and 7 and 8).

EXAMPLE 9

Example 1 was repeated except the solution was cured at a temperature of 180° F. The curing occurred in accordance with the Society of Plastics Institute 180° F. exotherm curve test as described in Handbook of Reinforced Plastics of the Society of Plastics Industry, Inc., 1964, page 51. The curing time is defined as that time at which the peak exotherm occurs. The maximum exotherm temperature was 185° F. and occurred after a time of 268 minutes. The product has a milky white color.

A series of runs was made repeating Example 3 except water, 3-picoline and/or benzoyl peroxide was added to determine the effect on the curing rate. The results of these runs are shown on Table II below:

TABLE II

| Example No. | Weight percent | | | Cure time,[1] hours | Color |
| --- | --- | --- | --- | --- | --- |
| | water | 3-picoline | Benzoyl peroxide | | |
| 9 | 0 | 0 | 0 | 268 | Milky white. |
| 10 | 0.5 | 0 | 0 | 110 | Do. |
| 11 | 0 | 3 | 0 | 15 | Medium amber. |
| 12 | 0.5 | 3 | 0 | 11½ | Milky white. |
| 13 | 0 | 0 | 1 | 78 | Do. |
| 14 | 0.5 | 0 | 1 | 38 | Do. |
| 15 | 0 | 3 | 1 | 12½ | Dark amber. |
| 16 | 0.5 | 3 | 1 | 9½ | Medium amber. |

[1] Curing by "Standard 180° F. Exotherm Curve" test.

Refering to Table II, the addition of 0.5 weight percent water resulted in a decrease in curing time to 110 minutes. Examples 11 through 16 above are comparable to Examples 3 through 8 in Table I and the same conclusions with respect to the addition of 3-picoline, benzoyl peroxide and water are applicable to the curing of the solutions at 180° F. as at room temperature except that at 180° F. it appears that the addition of the 3-picoline and peroxide results in a decrease in curing time compared to the use of the 3-picoline alone (compare Runs 11 and 15).

When Examples 9–16 were repeated except the styrene was omitted, no decrease in curing time was affected by the addition of water to the dry amine and/or peroxide systems. The addition of of amine, peroxide, or both resulted in reduction of curing time as in the styrene system.

EXAMPLE 17

Example 13 was repeated except only 20 weight percent styrene was employed. The curing time was 20.5 minutes.

EXAMPLE 18

Example 17 was repeated except 0.5 weight percent water was added. The curing time decreased to 15 minutes.

EXAMPLE 19

Example 17 was repeated except only 10 percent by weight styrene was added. The curing time was 7.5 minutes.

EXAMPLE 20

Example 19 was repeated except 0.5 percent by weight water was added. The curing time was substantially the same.

A comparison of Examples 17–20 shows that the lower concentration of styrene to achieve an effect of water on decreasing the cure time is about 20 weight percent. When 10 percent styrene is used (Example 19), the cure is very short (less than 10 minutes by the SPI test) and thus the water effect is not great. Decreasing the A/E ratio to 0.5 and the weight percent styrene to 5 gave results with and without water similar to Examples 19 and 20.

EXAMPLE 21

Example 17 was repeated except the percent of styrene added was increased to 80. The curing time was 143 minutes.

EXAMPLE 22

Example 21 was repeated except 0.5 weight percent water was added and the curing time was reduced to 136 minutes.

A comparison of Examples 17 and 18 with Examples 21 and 22 shows a reduction in curing time by the addition of water.

EXAMPLE 23

Example 17 was repeated except acrylonitrile was employed in place of the styrene. The curing time was about 20 minutes.

EXAMPLE 24

Example 23 was repeated except 0.5 weight percent water was added. The curing time was decreased to about 11 minutes.

EXAMPLE 25

Example 23 was repeated except methylmethacrylate was employed in place of the acrylonitrile. The curing time was less than 10 minutes by the SPI test.

EXAMPLE 26

Example 25 was repeated except 0.5 weight percent water was added. The curing time was substantially the same as in Example 25 where no water was added.

A comparison of Examples 17–20 and 23–26 shows that if the curing time of the composition is less than about 10 minutes by the SPI Exotherm Curve test, whether caused by too little unsaturated monooxirane-free monomer (Examples 19–20), or a vary reactive unsaturated monooxirane-free monomer (Examples 25–26), the effect of water on the curing time is necessarily not great.

Resort may be had to such variations and modifications as fall within the spirit of the invention and the scope of the appended claims.

We claim:

1. A method for increasing the rate of curing of a liquid composition having a curing time in excess of ten minutes by the addition of water to said liquid composition, said liquid composition comprising a solution of
(A) a solid polyanhydride compound containing at least three succinic anhydride groups and less than three conjugated double bonds when one of the conjugated double bonds is between the carbon atoms alpha to the carbonyl groups in a succinic anhydride group;
(B) a liquid monooxirane compound having the formula:

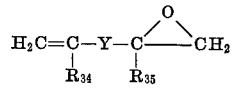

where $R_{35}$ is selected from the group consisting of hydrogen and a saturated hydrocarbon radical having between 1 and 10 carbon atoms;
where $R_{34}$ is selected from the group consisting of hydrogen; halogen; $-C \equiv N$;

—COOR″, where R″ is any saturated hydrocarbon radical having between 1 and 10 carbon atoms; and

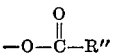

where R″ is as defined when Y is selected from the group consisting of

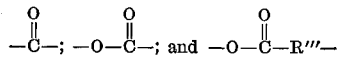

where R‴ is any divalent hydrocarbon radical having between 1 and 20 carbon atoms; and
where $R_{34}$ is selected from the group consisting of a saturated hydrocarbon radical having between 1 and 10 carbon atoms; hydrogen; halogen; —C≡N;

—COOR″, where R″ is as defined; and

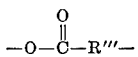

where R‴ is as defined when Y is

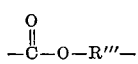

where R‴ is any divalent hydrocarbon radical having between 1 and 20 carbon atoms; and (C) an olefinically unsaturated monomer free of oxirane oxygen atoms and containing as its only functional groups at least one olefinic double bond capable of polymerization by free radical means;

wherein the equivalent ratio of (A) to (B) is between 0.25 and 2.0 with component (C) being present in an amount between 20 and 70 weight percent of the combined weight of (A) and (B); and wherein the amount of said liquid water is between 0.1 weight percent of said liquid solution and that amount of water which reacts in said solution at room temperature to form a homogeneous solution.

2. A method according to claim 1 wherein said component (A) is a copolymer of a straight chain alpha-monoolefin having between 4 and 20 carbon atoms and maleic anhydride; said component (B) is glycidyl methacrylate and said component (C) is an olefinically unsaturated monomer having the formula:

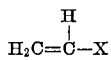

where X can be any aryl group having between 1 and 3 rings; halogen;

—C≡N; —OR$_{36}$ where R$_{36}$ is any hydrocarbon radical having between 1 and 20 carbon atoms which can be substituted by halogen and —C≡N groups; and

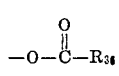

where R$_{36}$ is as defined.

3. A method according to claim 2 for increasing the rate of curing of said composition containing in addition between 0.1 and 3.0 weight percent of said solution of a soluble free radical catalyst.

4. A method according to claim 3 wherein the soluble free radical catalyst is an organic peroxide.

5. A method according to claim 4 wherein the soluble free radical catalyst is benzoyl peroxide.

6. A method according to claim 2 wherein the composition contains in addition a soluble tertiary amine.

7. A method according to claim 3 wherein the composition contains in addition a soluble tertiary amine.

8. A method according to claim 7 wherein the free radical catalyst is an organic peroxide and the soluble tertiary amine is 3-picoline.

9. A method according to claim 8 wherein the organic unsaturated monomer free of oxirane oxygen atoms is styrene.

10. A method according to claim 8 wherein the olefinically unsaturated monomer is acrylonitrile.

11. A method for increasing the rate of curing of a liquid composition having a curing time in excess of ten minutes by the addition of water to said liquid composition, said liquid composition comprising a solution of:

(A) a solid polyanhydride prepared by the copolymerization of (1) a succinic anhydride derivative having the formula:

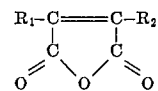

where R$_1$ is a member selected from the group consisting of hydrogen, halogen, a hydrocarbon radical and a substituted hydrocarbon radical; and R$_2$ is selected from the group consisting of hydrogen and halogen atoms; and (2) an olefinic compound represented by the formula:

where R$_3$ is selected from the group consisting of hydrogen, halogen, a hydrocarbon radical and a substituted hydrocarbon radical; and $x_1$ $x_2$ are selected from the group consisting of hydrogen, halogen, a hydrocarbon radical, a substituted hydrocarbon radical, and —OR where R is any hydrocarbon radical;

(B) a liquid monooxirane compound having the formula:

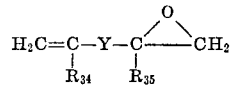

where R$_{35}$ is selected from the group consisting of hydrogen and a saturated hydrocarbon radical having between 1 and 10 carbon atoms;

where R$_{34}$ is selected from the group consisting of hydrogen; halogen; —C≡N;

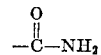

—COOR″, where R″ is any saturated hydrocarbon radical having between 1 and 10 carbon atoms; and

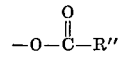

where R″ is as defined when Y is selected from the group consisting of

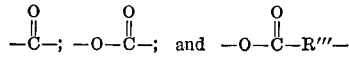

where R‴ is any divalent hydrocarbon radical having between 1 and 20 carbon atoms; and where R$_{34}$ is selected from the group consisting of a saturated hydrocarbon radical having between 1 and 10 carbon atoms; hydrogen; halogen; —C≡N;

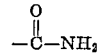

—COOR″, where R″ is as defined; and

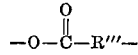

where R‴ is as defined when Y is

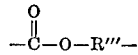

where R‴ is any divalent hydrocarbon radical having between 1 and 20 carbon atoms; and (C) an olefinically unsaturated monomer free of oxirane oxygen atoms and containing as its only functional groups at least one olefinic double bond capable of polymerization by free radical means; wherein the equivalent ratio of (A) to (B) is between 0.25 and 2.0 with component (C) being present in an amount between 20 and 70 weight percent of the combined weight of (A) and (B); and wherein the amount of said water is between 0.1 weight percent of said liquid solution and that amount of water which reacts in said solution at room temperature to form a homogeneous solution.

References Cited

UNITED STATES PATENTS

| | | | |
|---|---|---|---|
| 3,111,500 | 11/1963 | Bartl et al. | 260—41 |
| 3,162,696 | 12/1964 | Zimmerman et al. | 260—878 |
| 3,189,663 | 6/1965 | Nozaki | 260—879 |
| 3,256,362 | 6/1966 | Craubner et al. | 260—862 |
| 3,283,033 | 11/1966 | Johnson | 260—878 |
| 3,374,209 | 3/1968 | Hay et al. | 260—78.4 |
| 3,453,246 | 7/1969 | Heilman | 260—78.5 |

JOSEPH L. SCHOFER, Primary Examiner

S. M. LEVIN, Assistant Examiner